[84.]

JACOB S. FLEMING.
Improvement in Cultivators.

No. 118,522.        Patented Aug. 29, 1871.

Witnesses:
P. C. Dieterich
Gustave Dieterich

Inventor:
Jacob S. Fleming
Per Munn & Co.
Attorneys.

UNITED STATES PATENT OFFICE.

JACOB S. FLEMING, OF ISLAND CREEK, OHIO.

IMPROVEMENT IN CULTIVATORS.

Specification forming part of Letters Patent No. 118,522, dated August 29, 1871.

*To all whom it may concern:*

Be it known that I, JACOB S. FLEMING, of Island Creek, in the county of Jefferson and State of Ohio, have invented a new and useful Improvement in Cultivators; and I do hereby declare that the following is a full, clear, and exact description thereof, which will enable others skilled in the art to make and use the same, reference being had to the accompanying drawing forming part of this specification, in which—

Figure 1:
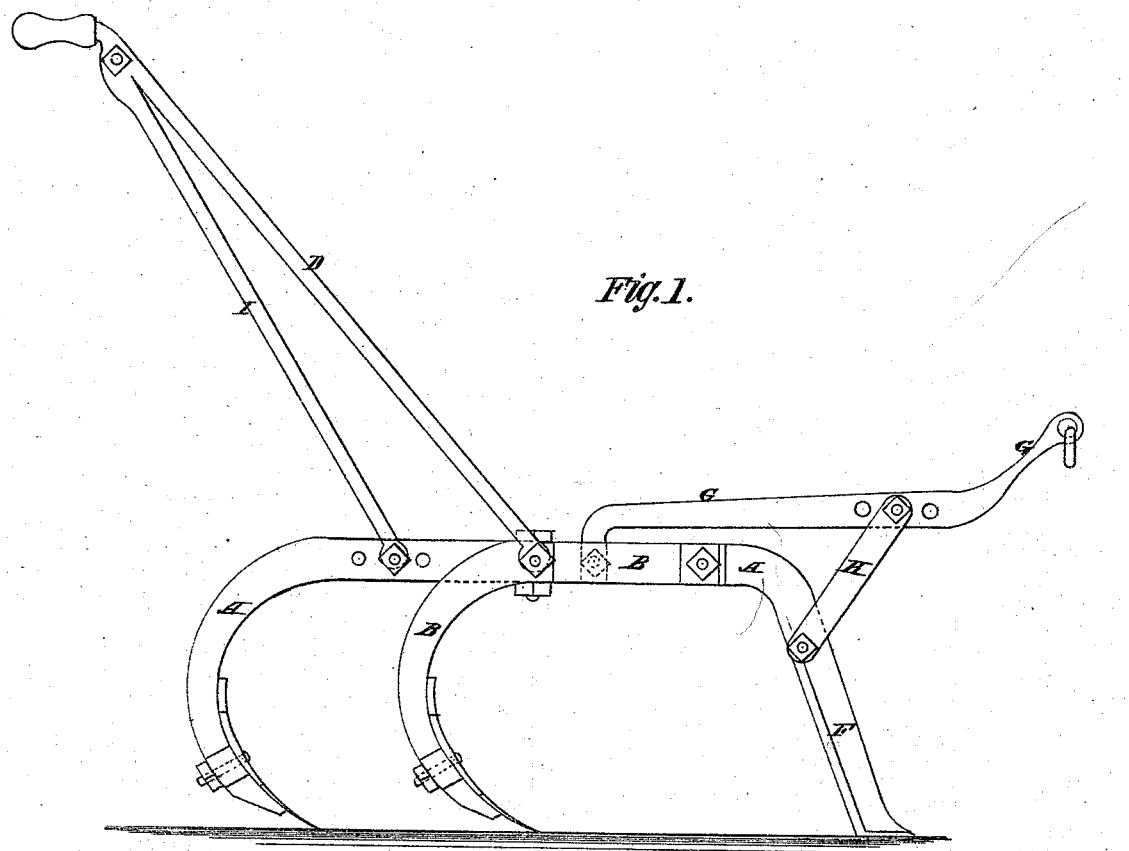
Figure 2:
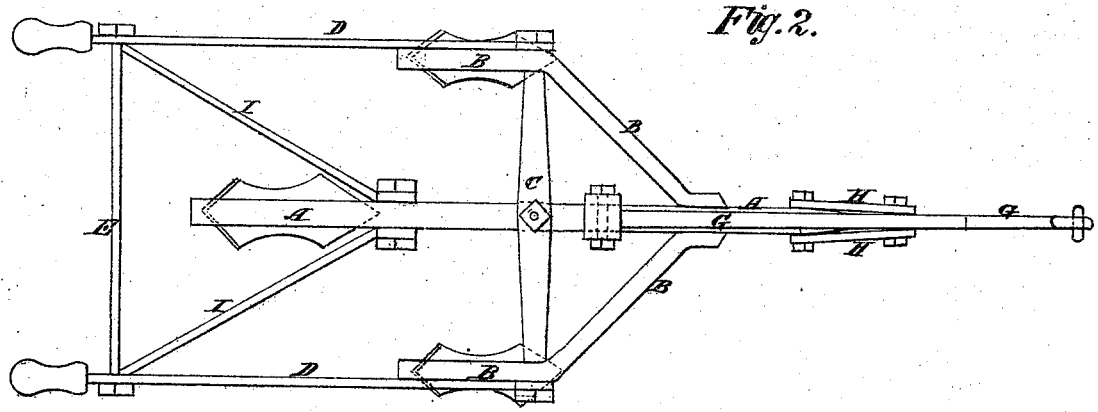

Figure 1 is a side view of my improved cultivator. Fig. 2 is a top view of the same.

Similar letters of reference indicate corresponding parts.

My invention has for its object to furnish an improved cultivator which shall be simple in construction, strong, durable, and compact, and at the same time effective in operation; and it consists in the construction and combination of certain parts of the cultivator, as hereinafter more fully described.

A is the central beam of the cultivator, to the sides of which, near its forward end, are bolted the forward ends of the side beams B. The rear ends of the side beams B are bent outward and are secured in their proper relative positions by a cross-bar, C, which is secured to the three beams A B B. The side beams B are made shorter than the central beam A, and the rear ends of the three beams B A B are curved downward to serve as standards to receive the plows, which are made double or with a point upon each end, so that when worn they may be detached, turned end for end, and again secured in place. D are the handles, the lower ends of which are secured to the rear parts of the side beams B. The upper parts of the handles D are connected and held in their proper relative position by a cross-bar, E, and are supported at a proper elevation by the brace-rods I, the lower ends of which are secured to the rear part of the center beam A. The forward part F of the center beam A is bent downward and has its forward edge sharpened to serve as a colter. G is the draft-bar, the rear end of which is pivoted to the beam A, and its forward end is bent upward and is provided with an eye-hook or ring for the attachment of the draft. H are two short connecting-bars, the lower ends of which are bolted to the upper part of the colter F and their upper ends are bolted to the draft-bar G, several holes being made in the said bar G to receive the said bolt, so that by shifting the said bolt rearward or forward the forward end of the draft-bar G may be raised or lowered, as may be required.

Having thus described my invention, I claim as new and desire to secure by Letters Patent—

. The colter F formed solid upon the forward end of the center beam A of the cultivator by bending the said forward end downward, substantially as herein shown and described, and for the purpose set forth.

JACOB S. FLEMING.

Witnesses:
JOSHUA CATTRELL,
THOS. O. JOHNSON.